June 29, 1965
J. W. HENDRY
3,191,234
APPARATUS FOR INJECTION MOLDING
Original Filed Jan. 27, 1960
2 Sheets-Sheet 2
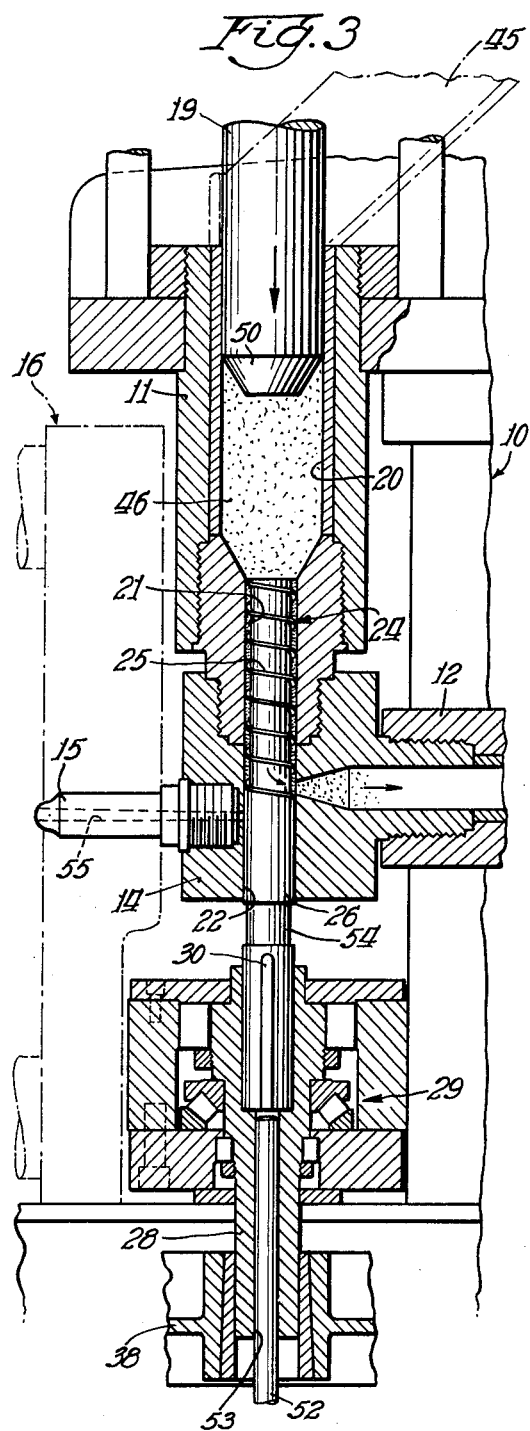
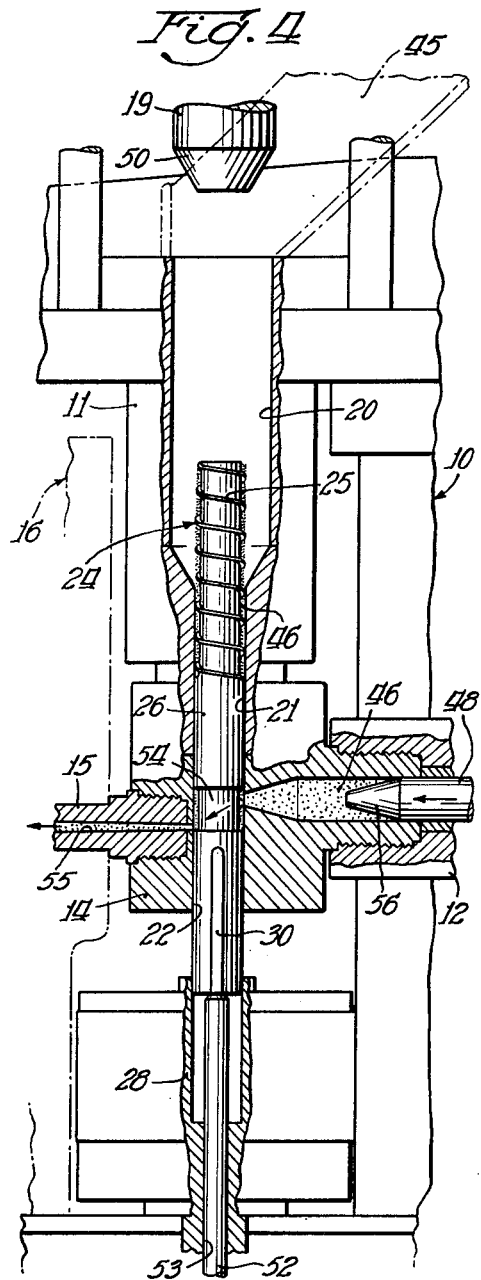
Inventor:
James W. Hendry
By: J. O. Watson Jr.
Atty.

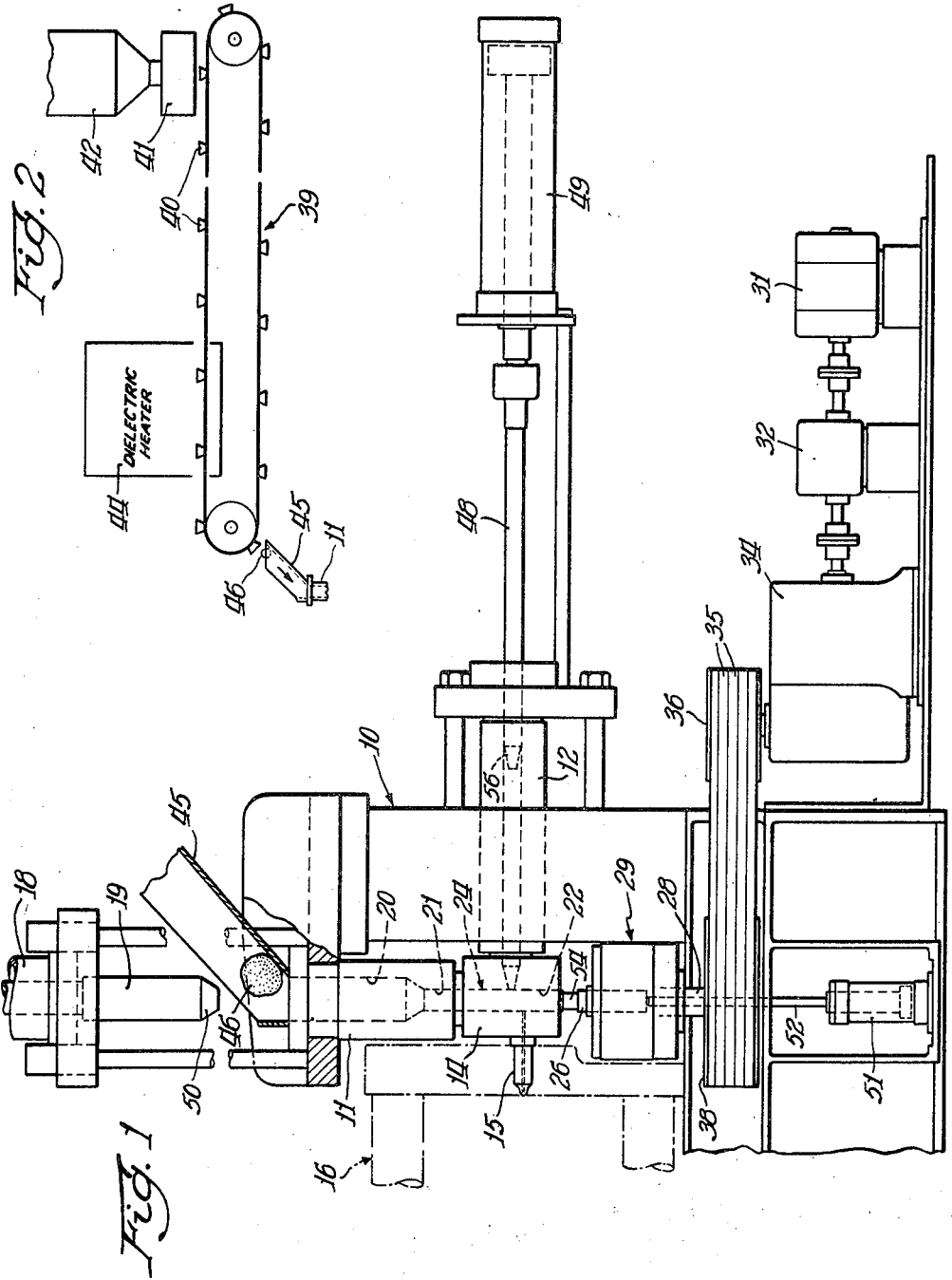

United States Patent Office 3,191,234
Patented June 29, 1965

3,191,234
APPARATUS FOR INJECTION MOLDING
James W. Hendry, Scottsburg, Ind., assignor to Borg-Warner Corporation, Chicago, Ill., a corporation of Illinois
Continuation of application Ser. No. 4,978, Jan. 27, 1960. This application Sept. 24, 1963, Ser. No. 311,594
14 Claims. (Cl. 18—30)

This invention relates to molding apparatus and more particularly to new and improved injection molding.

This application is a continuation of application Serial Number 4,978, filed January 27, 1960, and now abandoned.

Conventional injection molding machines are customarily provided with a material working and advancing screw which is utilized to charge the injection chamber. A power actuated ram is also customarily provided to force the molding material through an injection nozzle and into a mold to form the finished product. Such machines require that the plastic molding materials utilized be in a pelletized form. The fact that the materials must be pelletized is due to the inherent nature of the device itself, i.e., the screw will not function satisfactorily if the molding material supplied thereto is in powdered form. Because of the pelletized nature of the materials used in such machines, considerable working of the material and attendant frictional heat input is necessary to reduce the material to a plastic state and render it suitable for injection into a mold. This in turn necessitates the use of a screw of considerable length and hence a long flight. This, of course, results in an apparatus which holds a quantity of material sufficient to fill a mold many times. Thus, conventional machines must be cycled many times before a given charge of material can proceed completely through the machine from inlet to outlet. The molding material, when passing through a conventional machine, is therefore subjected to elevated temperatures for prolonged periods with the attendant deleterious effects. Consequently, lower heat levels must be maintained to offset these effects.

Also, as was pointed out above, conventional injection machines require that the materials supplied thereto be in pelletized form. This is disadvantageous since the manufacturing processes which produce molding materials normally end with the material in powdered form. In order to prepare powdered materials for utilization in a conventional injection machine, it is necessary that the powdered material be first worked into a plastic mass in a device such as a "Banbury" mixer, calendered, and the resulting sheets subsequently pelletized. These, of course, are additional steps, the elimination of which would obviously result in a reduction of manufacturing costs.

Manifestly, it would be highly desirable if an injection molding machine and method were available which retained a molding material within the machine for a minimum amount of time to avoid the detrimental effect on the molding materials of prolonged subjection to elevated temperatures and which was also capable of utilizing various molding materials in their original powdered form or briquettes made from the original powder without the necessity of the above mentioned pelletizing steps. It is therefore a primary object of this invention to provide just such an injection molding machine.

It is another object of this invention to provide an injection molding machine in which substantially all of the charge of material is moved completely through the machine from inlet to mold each time the machine is cycled.

It is a further object of this invention to provide an injection molding machine which is capable of operating directly upon molding materials in their original powdered form or in briquettes made from the original powder.

It is yet another object of this invention to provide an injection molding machine in which it is possible to obtain considerable variation in the frictional heat input to the molding material in order to accommodate a wide range of materials.

It is a still further object of this invention to provide an injection molding machine which may be changed over to another color or another material in a single cycle without contamination of the subsequently added charges.

It is yet another object of this invention to provide an injection molding apparatus with a dielectric heater for preheating the molding material to facilitate the handling of each charge of material subsequent to the preheating.

With these and other objects in view, the present invention contemplates an injection molding machine having a plasticizing chamber and an injection chamber interconnected by means of a transfer block. A material working and advancing screw and a hydraulically operated ram are provided for plasticizing the molding material and transfering the material to the injection chamber from the plasticizing chamber. A second hydraulically operated ram is provided for forcing molding material from the injection chamber through an injection nozzle in the transfer block and into a mold to form the finished product. A dielectric heater is provided to preheat each charge of material prior to its admission into the plasticizing chamber. A variable speed reversible drive is provided to rotate the screw in cooperation with or in opposition to the material advancing ram in order to permit a wide range of variation in frictional heat input in order to accommodate various types of molding material.

Other objects, advantages and novel features of the invention will become apparent upon consideration of the following detailed description taken in conjunction with the accompanying drawings wherein:

FIG. 1 is a side elevational view of an injection molding machine embodying the principal features of the invention;

FIG. 2 is a schematic representation of the apparatus utilized to feed measured and preheated charges of molding material to the apparatus of FIG. 1;

FIG. 3 is an enlarged fragmentary sectional view of the apparatus shown in FIG. 1 and illustrates the position of various components of the apparatus during the final plasticizing and transfer of the molding material to the injection chamber; and FIG. 4 is a view similar to FIG. 3 illustrating the relative positions of the various components of the apparatus during the injection of the molding material into the mold.

Attention is now directed to the drawings wherein like numerals of reference designate like parts throughout the several views and in particular to FIG. 1 wherein a preferred embodiment of the present invention is disclosed. A frame 10 is provided for mounting a plasticizing chamber 11 and an injection chamber 12. The plasticizing chamber 11 and injection chamber 12 are disposed at right angles to each other and are interconnected by means of a transfer block 14. An injection nozzle 15 is mounted in the transfer block 14 for fluid communication with the injection chamber 12 and is adapted to communicate with the injection port of a mold (not shown) which may be clamped in a mold clamping press partially illustrated in phantom at 16.

A double acting hydraulic cylinder 18 is disposed above the plasticizing chamber 11 and is provided with a material advancing ram 19 secured to the piston rod thereof. The ram 19 is of such diameter as to be a tight sliding fit within an enlarged upper portion 20 of the bore which defines plasticizing chamber 11.

The plasticizing chamber 11 is provided at the lower end thereof with a bore 21 (FIG. 3) of reduced diameter which is axially aligned with a bore 22 of similar size formed in the transfer block 14. A material working and advancing screw, designated generally at 24, is positioned for rotation within the bores 21 and 22. The screw 24 is provided with a flight 25 which enables the screw to function as a material working and advancing device in a well known manner. The screw is further provided with an unflighted shank 2 which is a tight sliding fit within the bore 22 and cooperates therewith to form a fluid seal and thus prevents fluid molding materials from exiting from the transfer block 14 through the bore 22.

The lower extremity of the shank 26 is slidably positioned within a spindle 28 which in turn is rotatably mounted on the frame 10 by means of a combination radial and thrust bearing arrangement designated generally by the reference numeral 29. A key 30 is mounted in an appropriate keyway in the shank 26 and serves to preclude rotational movement between the shank 26 and spindle 28 while permitting relative axial movement therebetween. A drive train (FIG. 1) is provided for rotating the screw 24 and comprises the following principal elements of a well known nature which will not be described in detail; a reversible drive motor 31, a multi-speed transmission 32, a speed reducer 34 and a plurality of V-belts 35 interconnecting a sheave 36 on the speed reducer 34 and a sheave 38 rigidly secured to the lower extremity of the spindle 28.

An indexing endless belt conveyer 39 (FIG. 2) having cups 40 secured thereto is provided for transferring powdered molding material from a metering device 41 associated with a drying hopper 42 to a dielectric preheater designated in phantom at 44. A chute 45 is positioned adjacent one end of the conveyer 39 so that as the cups 40 are inverted by the conveyer 39, the preheated material contained therein will fall into the chute and be guided into the bore 20 in the plasticizing chamber 11.

*Operation*

In order that a better understanding of the invention may be had, its mode of operation will now be described. The conveyer 39 is first started to sequentially index the cups 40 beneath the metering device 41. The device 41 meters measured quantities of powdered molding material from the hopper 42 into the cups 40. The hopper 42 is preferably a combination hopper and dryer chamber. That is, it is desirable that the hopper 42 be provided with means for circulating hot dry air through the powdered material. This serves a two-fold purpose. First, the hot dry air removes moisture from the powdered molding material and thus precludes the inclusion of moisture in the finished product which would create voids therein and thus render the products defective. Second, the hot dry air imparts heat to the powdered material so that the material is at an elevated temperature upon arrival in the dielectric oven 44. This is desirable because of the inherent nature of the response of plastic molding materials to dielectric heating. When a plastic molding material is subjected to a dielectric field of constant strength, the temperature rise of the material is not a linear function of time. With most conventional molding materials, the temperature of the material tends to raise uniformly, but slowly, until a temperature which might be called the minimum coupling temperature is achieved. When this coupling temperature is reached, the temperature of the material rises much more rapidly even though the power input to the dielectric heater remains constant. In fact, in the case of many materials, the temperature rise is so rapid that provision must be made for reducing the strength of the dielectric field to prevent charring or burning of the molding material. This may preferably be accomplished by a temperature sensitive device which effects a physical separation of the plates used to create the dielectric field in response to an increase in temperature of the molding material. The heat input to the molding material into the hopper 42 is therefore so adjusted that molding material in cups 40 is at the aforementioned coupling temperature upon arrival in dielectric heater 44.

When the cups 40 containing the molding material are indexed into the heater 44 they are subjected to a dielectric field and are preheated to a temperature suitable for the particular material involved. When any material is subjected to a high frequency dielectric field, the heating of all particles of the material occurs simultaneously. However, the outer materials heat up more slowly due to their contact with the container or with the ambient air since these do not respond to the dielectric field. That is, the inside of a batch of material is at a higher temperature than the outside. This phenomenon is utilized to advantage in the apparatus of the present invention. The heat input for any given molding material is so regulated that the bulk of each batch of material within one of the cups 40 will be rendered plastic while the exterior of the batch of material, though heated, remains at a temperature below the temperature at which it becomes plastic or liquid. Thus, as each charge of material exits from the heater 44, it is in the form of a fluid plastic surrounded by a thin shell of solid material which serves as a container to confine the fluid inner portion. As the conveyer continues to index, the cups 40 are inverted over chute 45 and balls of plastic material 46 contained therein fall and roll down the chute 45 and into plasticizing chamber 11.

Since the plastic material 46 arrives in the plasticizing chamber 11 with portions thereof in a solid or unplasticized state, it is necessary that the material be additionally worked in order to render the entire mass of plastic suitable for injection into a mold. To this end the cylinder 18 is actuated to cause the ram 19 to descend into the bore 20 and the drive motor 31 is energized to effect rotation of the screw 24. The descent of the ram 19 into the bore 20 exerts a force on the top of the molding material 46 and normally serves to supplement the action of the screw 24 to provide a positive displacement arrangement. As is well known in the art, rotating screws of this type are not positive in displacement due to the large amount of slip involved, but the action of the ram 19 in conjunction with the screw 24 serves to provide a positive displacement device. The plasticized material 46 flows along the screw 24 guided by flight 25 until it reaches the point adjacent the shank 26 where the flight 25 ends. From there the material flows into the injection chamber 12 and forces an injection ram 48 to the right, as viewed in FIG. 1. The ram 48 is mounted on the free extremity of the piston rod of a hydraulic cylinder 49. The hydraulic cylinder 49 is utilized to impose an adjustable back pressure on the material 46 to insure a dense mass of material when the injection chamber 12 has been filled. The ram 19 is provided with a frusto-conical portion 50 which is complementary in configuration to the lower end of the bore 20. The ram 19 descends until the portion 50 is positioned adjacent the upper extremity of the screw 24 to effect a complete clean-out of the plasticizing chamber 11. At this time all the molding material is within the injection chamber 12 except for a thin ribbon thereof which spirals around the flighted portion of the screw 24 and lies between adjacent sections of the flight 25. At this time the molding material is all in a plastic state due to the additional heat imparted thereto due to the mechanical working of the material by the ram 19 and screw 24. The molding material is now ready for injection into a mold.

To effect this, a hydraulic cylinder 51 is actuated to cause its piston rod 52 to move upwardly as viewed in the drawings. As the piston rod 52 moves upwardly, it slides within a bore 53 formed in the spindle 28 and engages the bottom of the shank 26 of the screw 24. Continued upward movement of the piston rod 52 then causes the screw 24 to be moved axially in the bores 21 and 22. The stroke of the cylinder 51 is so adjusted that upon completion of the axial movement of the screw 24, a reduced portion 54, formed in the shank 26, will be positioned as shown in FIG. 4. With the screw in this position, the reduced portion 54 cooperates with the bore 22 to define a passage providing fluid communication between the injection chamber 12 and an injection orifice 55 formed in a nozzle 15. The cylinder 49 is then actuated to cause the ram 48 to move to the left as viewed in the drawings. This movement of the ram 48 forces the material 46 out of the injection chamber 12, around the reduced portion 54, through the orifice 55 and into the mold (not shown) held in the press 16. The leftward movement of the ram 48 continues until a frusto-conical extremity 56 thereof engages a complementary section in the transfer block 14 to effect a complete clean-out of the injection chamber 12. The hydraulic cylinders 18, 49 and 51 may then be actuated to return the rams 19 and 48 and the screw 24 to the positions shown in FIG. 1 to complete the cycle. The machine may then be recycled in the manner just described.

Thus it can be seen that a method and apparatus have been described which possess advantages not found in the prior art devices and processes. Some of the more salient advantages of the present invention will now be described. By providing the dielectric heater 44 for use in conjunction with the injection apparatus, it is possible to impart considerable heat to the molding material prior to the entrance thereof into the plasticizing chamber due to the thin skin which results from the dielectric heating. This thin skin greatly facilitates the handling of charges of molding material since it is unnecessary to cope with fluid or semi-fluid masses of material.

The provision of the reversible motor 31 and the multispeed transmission 32 permits the screw 24 to be rotated in either direction to supplement or oppose the action of the ram 19. As a third alternative, the screw 24 may be maintained stationary and the molding material 46 forced into the injection chamber 12 solely as a result of the pressure exerted by the ram 19 forcing the molding material around the flight 25 of the stationary screw and into the injection chamber 12. This versatile drive arrangement permits a large degree of variation in the frictional heat input to the charge of molding material since there will obviously be considerably more working of the material 46 when the screw 24 is rotating in the direction tending to move the material 46 upwardly in the chamber 11 while the ram 19 is forcing material in the opposite direction than would be the case if the screw were rotating in the opposite direction and thus supplementing the action of the ram 19.

Because the rams 19 and 48 completely clean-out the chambers 11 and 12 during each operation thereof, substantially all of each charge of material is moved completely through the machine in a single cycle with very little hold up of material. The little material which remains within the machine upon completion of a cycle is cleared out in the next cycle. This obviously facilitates a change over to another color or another material with a minimum of waste. Due to this substantially complete clean-out of the machine during each cycle, none of the molding material is held at elevated temperatures for prolonged periods. This results in a more favorable heat history of the material, precludes decomposition resulting from prolonged exposure to elevated temperatures, and facilitates a better flow of the molding material through the apparatus.

Also, because no bank of material is held at elevated temperatures for considerable periods of time, it is possible to operate the apparatus of the present invention at higher temperatures for a given material than is possible with conventional machines. The ability to operate at higher ultimate temperatures for a given material yields numerous advantages. For example, the higher temperature results in lower viscosities which in turn permit lower injection pressures. This in turn permits a greater projected area per ton of available mold clamping pressure.

Also, the lower viscosities permit the molding material to arrive at its ultimate position within the mold in a more fluid state and hence there are less internal strains produced in the mold parts. Thus, it can be seen that the present invention is a new and improved injection molding apparatus possessing numerous advantages and features not available in conventional injection molding machines.

It is to be understood that the above described embodiment of the invention, while a preferred embodiment, is merely illustrative of the principles of the present invention. Numerous other arrangements and method steps may be readily devised by those skilled in the art which will embody the principles of the invention and fall within the spirit and scope thereof.

I claim:
1. An injection molding apparatus comprising:
   an injection chamber;
   a plasticizing chamber;
   a passageway connecting one end of said plasticizing chamber with said injection chamber;
   a screw rotatably supported concentrically and snugly within said passageway and means for rotating said screw;
   positive displacement means within said plasticizing chamber for moving plastic material from said plasticizing chamber through said passageway and around said screw and thence into said injection chamber;
   an injection nozzle and means within said injection chamber for discharging plastic material from said injection chamber through said nozzle.
2. An injection molding apparatus comprising:
   a plasticizing chamber;
   an injection chamber;
   means for positively displacing material through said plasticizing chamber and into said injection chamber;
   an injection nozzle;
   means for discharging the material from said injection chamber through said nozzle; and
   means forming a part of said displacing means for selectively providing communication between said injection chamber and either said plasticizing chamber or said nozzle.
3. An injection molding apparatus comprising:
   a plasticizing chamber;
   an injection chamber;
   means for positively displacing material through said plasticizing chamber and into said injection chamber;
   an injection nozzle;
   means for discharging material from said injection chamber through said nozzle; and
   means forming a part of said displacing means operative to allow flow of material from said plasticizing chamber into said injection chamber while preventing communication between said injection chamber and said nozzle and to prevent communication between said chambers when said injection chamber is in communication with said nozzle.
4. An injection molding apparatus comprising:
   a dielectric heater;
   a plasticizing chamber;
   means for transferring preheated material from said dielectric heater to said plasticizing chamber;
   an injection chamber;
   means for positively displacing material through said plasticizing chamber and into said injection chamber;
   an injection nozzle;
   means for discharging material from said injection chamber through said nozzle; and
   means forming a portion of said displacing means operative to allow flow of material from said plasticizing chamber into said injection chamber while preventing communication between said injection chamber and said nozzle and to prevent communi- cation between said chambers when said injection chamber is in communication with said nozzle.

5. An injection molding apparatus comprising:
a plasticizing chamber;
an injection chamber;
means for positively displacing material through said plasticizing chamber and into said injection chamber;
passage means formed in said displacing means;
an injection nozzle;
means for discharging material from said injection chamber through said passage means and said nozzle;
said passage means being inoperative to provide communication between said injection chamber and said nozzle while said displacing means is performing a displacing function; and
means for shifting the position of said displacing means to position said passage means for interconnection of said injection chamber and said nozzle whereby material may be discharged from said injection chamber and through said nozzle.

6. An injection molding apparatus comprising:
an injection chamber;
a plasticizing chamber;
a material working and advancing screw positioned within said plasticizing chamber and cooperable therewith for displacing material through said plasticizing chamber and into said injection chamber;
passage means formed in said screw;
an injection nozzle;
means for discharging material from said injection chamber; and
means for shifting said screw to align said passage means with said injection chamber and said nozzle whereby said discharging means may force material from said injection chamber through said passage means and said nozzle.

7. An injection molding apparatus comprising:
a dielectric preheater;
a plasticizing chamber;
means for transferring preheated molding material from said preheater to said plasticizing chamber;
an injection chamber;
a material working and advancing screw positioned within said plasticizing chamber and cooperable therewith for displacing material through said plasticizing chamber and into said injection chamber;
passage means formed in said screw;
an injection nozzle;
means for discharging material from said injection chamber; and
means for shifting said screw to align said passage means with said injection chamber and said nozzle nozzle whereby said discharging means may force material from said injection chamber through said passage means and said nozzle.

8. An injection molding apparatus comprising:
an injection chamber;
a plasticizing chamber;
a material working and advancing screw disposed in one end of said plasticizing chamber;
a material advancing ram disposed in the opposite end of said plasticizing chamber;
said screw and said ram being cooperable to positively displace material through said plasticizing chamber and into said injection chamber;
an injection nozzle;
means for discharging material from said injection chamber through said nozzle; and
means forming a part of said advancing screw for selectively providing communication between said injection chamber and either said plasticizing chamber or said nozzle.

9. An injection molding apparatus comprising:
an injection chamber;
a plasticizing chamber;
a material working and advancing screw disposed in one end of said plasticizing chamber;
a material advancing ram disposed in the opposite end of said plasticizing chamber;
said screw and said ram being operable to positively displace material through said plasticizing chamber and into said injection chamber;
means for discharging material from said injection chamber;
an injection nozzle;
passage means formed in said screw; and
means for shifting the position of said screw to align said passage means with said injection chamber and said nozzle whereby said discharge means may force material from said injection chamber through said passage means and said nozzle.

10. An injection molding apparatus comprising:
a dielectric heater for preheating molding material;
a plasticizing chamber;
means for transferring the preheated material from said heater to said plasticizing chamber;
an injection chamber;
a material working and advancing screw disposed in one end of said plasticizing chamber;
a material advancing ram disposed in the opposite end of said plasticizing chamber;
said screw and said ram being operable to positively displace material through said plasticizing chamber and into said injection chamber;
means for discharging material from said injection chamber;
an injection nozzle;
passage means formed in said screws; and
means for shifting the position of said screw to align said passage means with said injection chamber and said nozzle whereby said discharge means may force material from said injection chamber through said passage means and said nozzle.

11. An injection molding apparatus comprising:
a plasticizing chamber;
an injection chamber transversely disposed with respect to said plasticizing chamber and in communication therewith;
a material working and advancing screw disposed within said plasticizing chamber for displacing material through said plasticizing chamber and into said injection chamber;
passage means formed in the shank of said screw;
an injection nozzle;
means for discharging the material from said injection chamber through said passage means and said nozzle; and
means for axially shifting said screw within said plasticizing chamber to align said passage means with said injection chamber and said nozzle whereby said discharging means is rendered effective.

12. An injection molding apparatus comprising:
an injection chamber;
a plasticizing chamber transversely disposed with respect to said injection chamber and in communication therewith;
a material working and advancing screw disposed within one end of said plasticizing chamber and adjacent the point of communication with said injection chamber;
a material advancing ram disposed in the opposite end of said plasticizing chamber;
said screw and said ram being cooperable for positively displacing material through said plasticizing chamber and into said injection chamber;
passage means formed in the shank of said screw;
an injection nozzle;
means for discharging material from said injection chamber; and
means for axially shifting said screw within said plasticizing chamber to position said passage means for interconnection of said injection chamber and said nozzle whereby said discharging means may force material from said injection chamber through said passage means and said nozzle;

said passage means being rendered ineffective to interconnect said injection chamber and said nozzle when said screw is in the unshifted, material advancing position.

13. An injection molding apparatus comprising:
a plasticizing chamber;
an injection chamber transversely disposed with respect to said plasticizing chamber and in communication with a first end thereof;
a material working and advancing screw disposed within said first end of said plasticizing chamber;
drive means for rotating said screw;
a material advancing ram disposed within the opposite end of said plasticizing chamber;
means for effecting reciprocation of said ram;
said screw and said ram being cooperable for positively displacing material through said plasticizing chamber and into said injection chamber;
an injection nozzzle mounted in the wall of said plasticizing chamber and adjacent the point of communication between said chamber;
passage means formed in the shank of said screw and defined by a reduced portion thereof; and
means for axially shifting said screw toward said ram to position said passage means for interconnection of said injection chamber and said nozzle whereby said discharging means may force material from said injection chamber through said passage means and said nozzle;
the shank of said screw disposed between the flighted and reduced portions of said screw being of such diameter as to preclude communication between said injection chamber and said nozzle when said screw is in the unshifted, material advancing position.

14. An injection molding apparatus comprising:
a dielectric heater for preheating molding material;
a plasticizing chamber;
means for transferring the preheated molding material from said heater to said plasticizing chamber;
an injection chamber transversely disposed with respect to said plasticizing chamber and in communication with a first end thereof;
a material working and advancing screw disposed within said first end of said plasticizing chamber;
drive means for rotating said screw;
a material advancing ram disposed within the opposite end of said plasticizing chamber;
means for effecting reciprocation of said ram;
said screw and said ram being operable for positively displacing material through said plasticizing chamber and into said injection chamber;
an injection nozzle mounted in the wall of said plasticizing chamber adjacent the point of communication between said chambers;
passage means formed in the shank of said screw and defined by a reduced portion thereof; and
means for axially shifting said screw toward said ram to position said passage means for interconnection of said injection chamber and said nozzle whereby said discharging means may force material from said injection chamber through said passage means and said nozzle;
the shank of said screw disposed between the flighted and reduced portions of said screw being of such diameter as to preclude communication between said injection chamber and said nozzle when said screw is in the unshifted, material advancing position.

References Cited by the Examiner
UNITED STATES PATENTS

| 3,020,591 | 2/62 | Breher et al. | 18—30 |

FOREIGN PATENTS

| 1,144,411 | 4/57 | France. |

References Cited by the Applicant
UNITED STATES PATENTS

| 2,469,342 | 5/49 | Richardson. |
| 2,478,013 | 8/49 | Roddy. |
| 3,029,471 | 4/62 | Adams et al. |

MICHAEL V. BRINDISI, *Primary Examiner.*